July 13, 1948.  C. M. WOLFE  2,445,200
MANOMETER
Filed Dec. 20, 1943  2 Sheets-Sheet 1

ADDITIONAL LIKE MANOMETER UNITS ARE CONNECTED TO THE TERMINALS OF THE MASTER UNIT THE SAME AS THE ONE SHOWN.

INVENTOR
CHARLES M. WOLFE
BY Reynolds + Beach
ATTORNEYS

July 13, 1948. C. M. WOLFE 2,445,200
MANOMETER
Filed Dec. 20, 1943 2 Sheets-Sheet 2
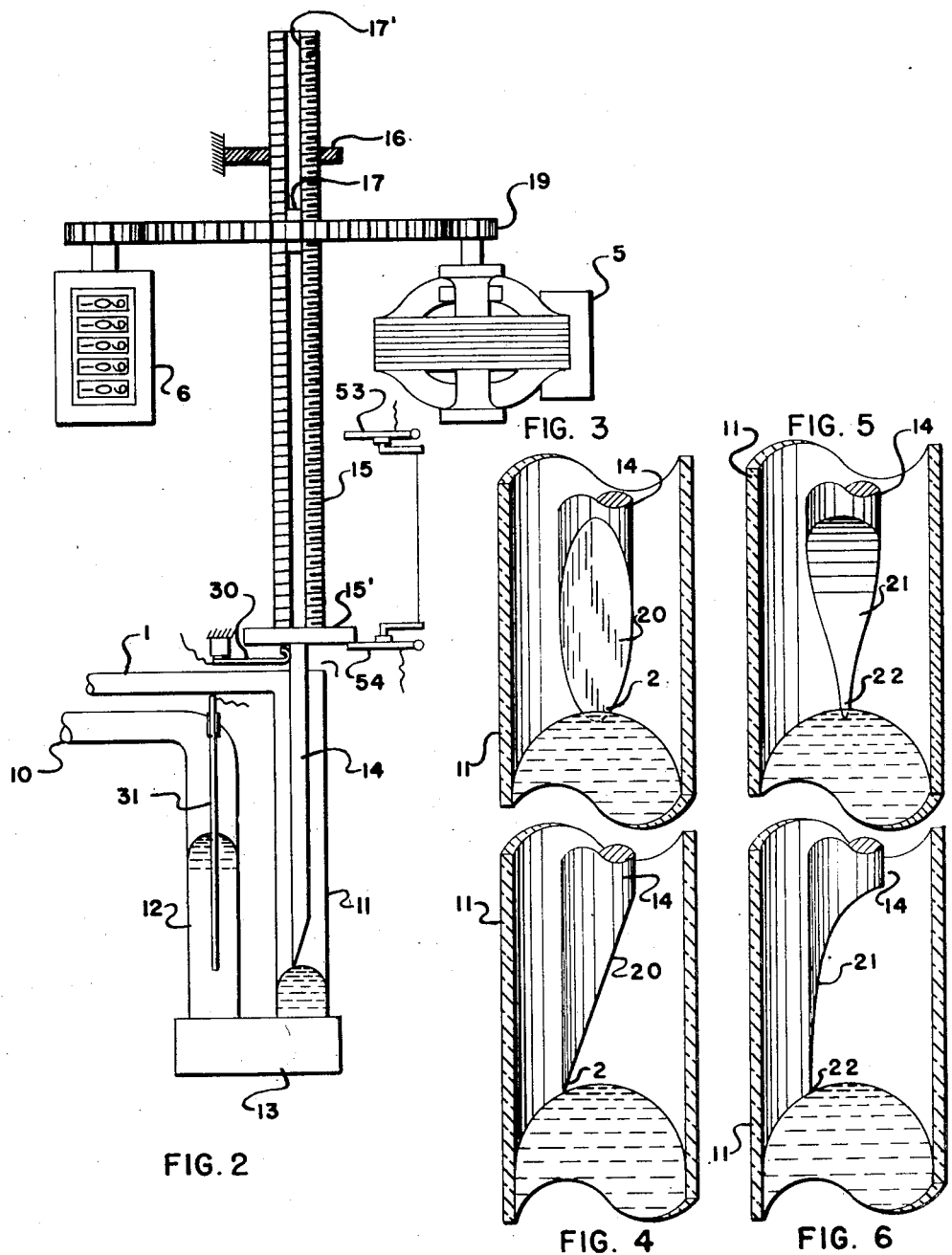
INVENTOR
CHARLES M. WOLFE
BY *Reynolds + Beach*
ATTORNEYS Patented July 13, 1948

2,445,200

UNITED STATES PATENT OFFICE 2,445,200

MANOMETER

Charles Morgan Wolfe, Seattle, Wash., assignor to Boeing Airplane Company, a corporation of Delaware Application December 20, 1943, Serial No. 514,961

19 Claims. (Cl. 177—351)

My invention relates to manometer mechanism, and to an electric control system in which it may be used.

In experimental work, such as in wind tunnel testing, for example, it is sometimes necessary to measure simultaneously a number of fluctuating factors. Furthermore it is usually desired to make a permanent record of the several measurements. As a specific illustrative example we may consider the study of variations in flow conditions through a wind tunnel over a model of an airplane. The nature of the air flow over such a model varies with the air speed and with the angle of attack of the model in pitch and yaw. The velocities of local air flow over different portions of the model, for example along the wing span, also differ at a constant wind tunnel air speed and for a particular attitude of the model.

The function of my mechanism is to measure and to record individually several similar factors, such as local air speed at various locations on the model, by ascertaining the air pressures simultaneously at each of such locations. The relative pressures at any given instant will indicate the comparative variations in air speed, for example, between the several locations. Systems for making such measurements by the use of manometer tubes have been proposed heretofore, but have been found to be inaccurate, either because of inherent limitations in the mechanism or because the several elements would not operate sufficiently quickly to follow rapid fluctuations in pressure.

It is an object of my invention to provide a system in which all the manometer tubes in a bank, each connected to a different location at which pressure is to be determined, can be set simultaneously to operate in synchronism. Furthermore, it is an object to obtain a reading of all the manometer tubes simultaneously at any selected instant.

An additional object is to enable manometer mechanism to measure minute fluctuations in pressure with extreme accuracy. The construction of the manometer units, however, is nevertheless simple and durable.

More specifically, it is an object to utilize a manometer contact element for conducting current from a mercury column which is capable of closing a circuit between these elements upon relative approach movement, and which will break the circuit between such elements almost immediately upon their separation.

A further object is to incorporate control devices in a manometer system of the general type under consideration which will enable an operator to control the operation of the mechanism for correlating movement of the several elements, and to obtain a printed record of the readings, by manipulating few controls, the operation of the mechanism for the most part being automatic. It is also desired to provide suitable safety devices for interrupting operation of individual elements of the system when necessary to prevent damage to its parts.

Other objects of my invention will be understood from the particular description of the system and its various components which follows. The drawings illustrate apparatus which is entirely satisfactory for most installations, but its principles may be incorporated in systems which differ specifically from that illustrated in various respects.

Figure 2 is an elevation view showing somewhat diagrammatically the mechanical components of a manometer unit.

Figure 3 is a vertical section through a manometer, showing one type of contact element in elevation, while Figure 4 is a similar vertical section showing the same type of contact element rotated through an angle of 90 degrees from the position of Figure 3.

Figure 5 is a vertical section through a manometer, incorporating a somewhat different type of manometer contact element shown in elevation, and Figure 6 is a similar vertical section portraying the same element in elevation but rotated through an angle of 90 degrees from the position of Figure 5.

Figure 1:
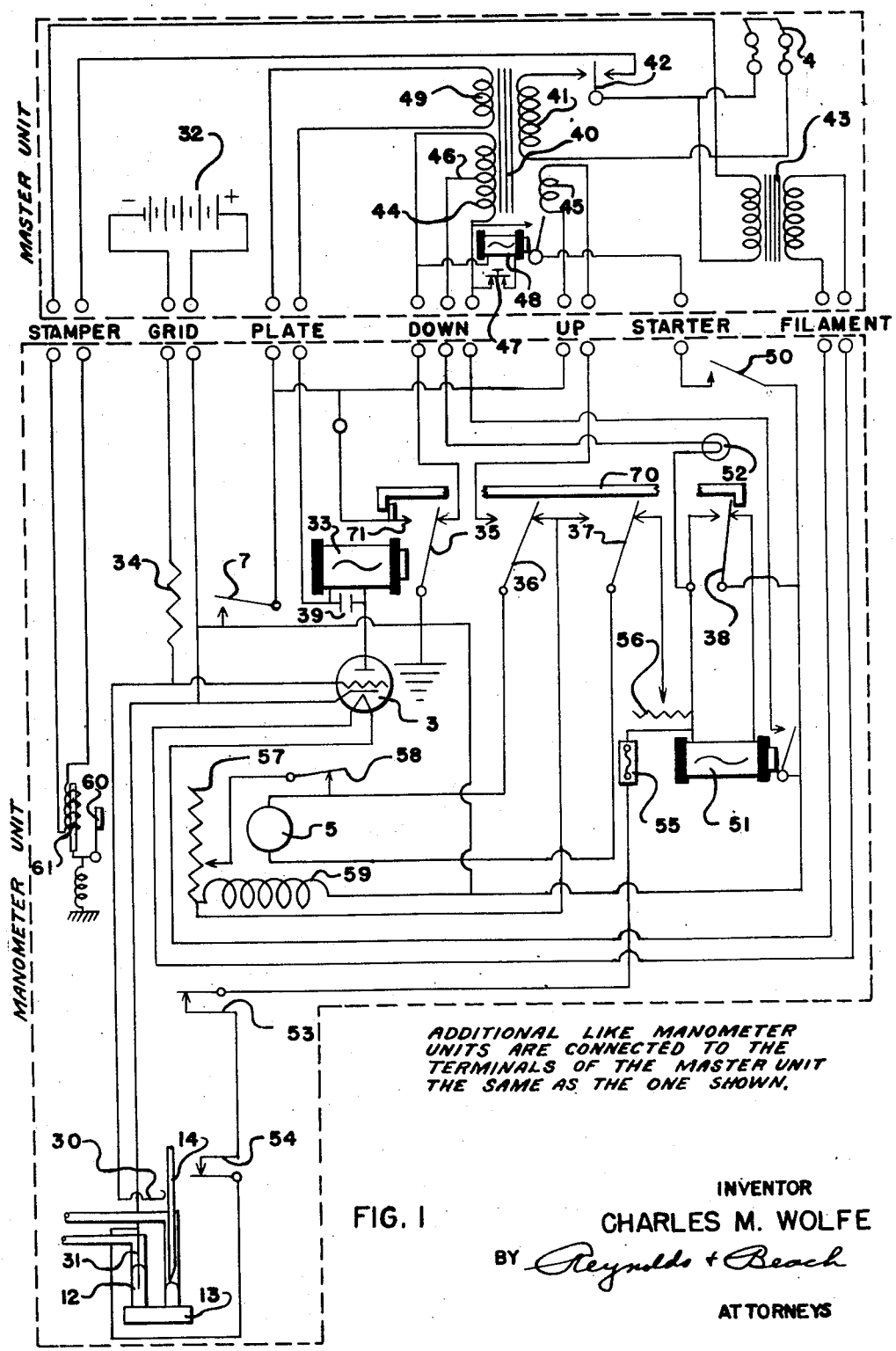
Figure 1 is a circuit diagram of my system illustrating its components for only a single manometric unit.

As representative of a typical application for my system, I shall describe it in connection with measurement of air flow velocities in different portions of a wind tunnel, or at different locations on an airplane model being tested. In such a system, it will be evident that a number of manometer units will be required, one for each air speed to be measured. The pressure to which each manometer tube is subjected will be related to the speed of air flow past the opening of the tube conduit, according to conventional practice. A conduit connected to one leg of the manometer tube may be exposed to static atmospheric pressure, for example, and the conduit connected to the other leg subjected to the impact pressure of the air flow, or to the suction effect of such air flow past the end of such conduit when disposed perpendicular to the air flow. The particular manner in which the several manometer units are subjected to differential air pressure is not important, as far as my invention is concerned, except that the application of pressure should be made in the same fashion to each manometer unit of those whose values are to be compared.

My system is arranged to accommodate any number of manometer units, all being identical and capable of assembly with a master control system, being connected in parallel. In Figure 2 is shown a manometer unit consisting of a U-tube assembly connected by ducts to regions under different pressures. Conduit 1, for example, may lead to a reference pressure region, usually at atmospheric pressure, whereas conduit 10 will be connected to a higher or a lower pressure region related to the air flow to be measured. A conventional U-tube may be employed in the manometer unit, but I prefer to connect the conduits 1 and 10, respectively, to two straight sections of tubing 11 and 12, the lower ends of which are inserted into a block 13, having a passage communicating between the inserted ends of tubes 11 and 12. These tubes may thus be removed readily for cleaning or replacement.

If the pressure in conduit 10 drops below that in conduit 1, the mercury column in tube 11 will be depressed by the greater reference pressure and the mercury column in tube 12 will rise correspondingly. The height of the mercury column in tube 11, thus governed by the air velocity at the selected location to which conduit 10 is connected, may be recorded at any instant by my automatic mechanism. Such apparatus, for example, may include a mercury contact rod 14 extending down into tube 11 and positioned vertically in response to variations in height of the mercury. The rod may pass through an aperture in the upper end of tube 11, preferably closed by suitable packing, but this precaution may be unnecessary if the reference pressure with which conduit 1 communicates is equal to atmospheric pressure, or substantially so.

It is the height of the mercury column surface in each of the various tubes 11 which it is desired to determine. Yet current would flow through each mercury column and its contact rod 14 however far the rod end is submerged in the mercury, so long as it is dipped into the mercury far enough to establish contact. Conversely, if the contact point is not engaged with the mercury, or insufficiently to establish an electrical connection, the spacing of the rod end above or below the mercury surface is not reflected by the circuit interruption. Moreover, because the height of each mercury column fluctuates, a definite relationship, or even an average relationship, to the surface of the column cannot be preserved unless the contact rod follows the undulations of the mercury. It is therefore necessary to provide mechanism for moving each rod up and down corresponding to the movement of the mercury column, so that the position of the rod will coincide with the height of the mercury.

These considerations present two problems, the first of which is the provision of mechanism to raise and lower rod 14 in a controlled manner. A record can then be made of the location of the rod at the instant an electrical circuit is closed as it dips into the mercury, or at the instant contact is broken by its being withdrawn from the mercury. Such record is of the rod position, of course, rather than the height of the mercury column itself, so that, at least at the instant the record is made, the relationship of the end of the contact rod 14 to the surface of the mercury must be known, and preferably they should substantially coincide.

Mercury in a tube has a convex meniscus covered by a tenacious film. The second problem, therefore, is to establish an electricity conducting contact between the rod 14 and the mercury at the very instant the end of the rod barely touches the upper surface of the mercury, and to interrupt such contact at the instant the rod tip emerges from the mercury. A conventional pointed rod produces an appreciable depression or cup on the surface of the mercury as it moves downward before contact is effected by piercing the surface film, and the point draws upward a blob of mercury from its surface to prolong the contact as the rod is raised above the general surface of the column. Moreover the depth of the depression and the size of the blob vary from time to time and from unit to unit, so that the measurements obtained are quite erratic. To solve the above problem, therefore, I have developed a special type of contact rod which is manipulated in a unique manner.

Instead of being movable merely vertically the rod is also rotated fairly rapidly. Its threaded shank 15, rather than being threaded into a rotating nut, is itself rotated relative to a fixed nut 16, and is, therefore, revolved as it is moved axially. A key 17, carried by gear 18, slides along a keyway 17' extending lengthwise of the shank 15 integral with contact rod 14. Gear 18 is rotated by a spur gear 19, in turn driven by a motor 5 controlled in a manner which will be described hereafter.

The rotary motion of contact rod 14 imparted to it by its spindle 15, as it moves lengthwise, is utilized to facilitate prompt penetration of the rod end into the mercury in tube 11 to afford an instantaneous electrical contact between these elements. This is accomplished by beveling the lower end of the rod to form a sharp eccentric tip. Such a tip 2 will result if the end of a rod of cylindrical shape is cut along a plane inclined relative to the rod's axis, as shown in Figures 3 and 4, to form such tip at the periphery of the rod. The degree of inclination of such intersecting plane 20 may be varied, of course, within limits, to determine the fineness of the tip thus formed by the intersection of such plane with the curved side of the rod at its extremity. The profile of the inclined rod end will be truly elliptical in outline, as seen almost in its true shape in Figure 3. Thus it will be evident that when the rod is rotated about its axis at the same time that it is being moved downward toward the surface of the mercury, at the instant the tip touches the mercury it will slice into the film covering its meniscus at a predetermined distance from its center by virtue of the rod's rotation which moves the end of the tip substantially horizontally, generally parallel to the surface of the mercury. The intimate engagement thus produced will have the effect of immediately establishing an electrical contact between the rod and the mercury, which is not the case when a centrally pointed rod is projected longitudinally into the mercury.

In order to obtain as prompt contact as possible between the tip of the contact rod and the mercury with the minimum disturbance, it may be desirable to make the contact rod tip even more attenuate, especially if the current to be conducted between the mercury and the rod is small. Such result may be obtained by shaping the inclined end 21 of the rod concavely, as shown in Figs. 5 and 6, instead of planar as in Figs. 3 and 4. The point 22 thus formed at the periphery of the rod will be of much greater extent circumferentially of the rod than radially, its circumferential to radial extent proportion being much greater than that of the tip shown in Figs. 3 and 4, so that it constitutes an extremely thin and sharp slicing tip, yet will have comparatively great stiffness in the direction of its rotative movement because of its substantial circumferential extent. I have found that a point particularly of the latter type will penetrate the surface film on the mercury immediately upon contact with it, and break contact the instant it is raised above the surface, and yet will operate satisfactorily for a considerable period of time, providing that the current which it carries is not too great. Thus, for example, such a tip on a steel rod one-eighth inch in diameter is capable of carrying a current up to 10 microamperes for a number of months and perhaps indefinitely, without being injured.

Having devised a simple and accurate electrical contact member, mechanism for incorporating a number of these manometer units in a single coordinated system may be considered. The general purpose of such a system is to control the vertical movement of the several rods 14 so that at the same instant they may all bear identical relationships to their respective manometer mercury columns. Thus, for example- if the rods of all the manometer units are reciprocated in unison, first downward to dip their tips into the mercury, and then upward after momentary contact with the mercury, a record of all the rod positions immediately after contact is interrupted by movement of their tips out of the mercury would correspond very closely to the height of the respective mercury columns. Particularly is this true if the initial downward movement of each rod is started from a point just above the mercury surface.

I have developed an electrical circuit to accomplish such operation by control of the several motors 5, each of which rotates the spindle 15 of rod 14 in its particular unit. Power is supplied to all the manometer units by a master circuit having bus connections to which the individual units may be connected in parallel. For that reason only the master circuit and a single manometer unit circuit is illustrated, and only their operation need be described to indicate that of the entire system.

The current is supplied from the usual 110-volt alternating current source to which the master circuit is connected by switch 4. A transformer 40 furnishes various voltages, and is energized by primary winding 41 controlled by switch 42, which, as illustrated, is a double throw switch to energize alternatively motor transformer 40 or a stamper circuit bus. Current from a separate transformer 43 is used for heating the filaments of the several tubes 3.

One transformer secondary winding 44 supplies the power for driving the motors 5 to move rods 14 rapidly downward, and may be of 12-volt potential, while another secondary winding 45, which may be of 6- to 12-volt potential, furnishes current for operating the motors to raise such rods. A center tap 46 may be connected in circuit with either end of secondary winding 44 to provide alternative 6-volt circuits for energizing a signal light, as will be discussed hereafter.

Since it is desirable to limit the current carried by the tip of contact rods 14 to a low value I prefer to provide a high resistance motor control circuit which employs a vacuum tube 3 for each manometer unit. The grid and cathode of this tube are in circuit with the manometer mercury column, the grid being connected to a brush 30 in contact with rod 14, and the cathode being connected to a contact rod 31, the end of which is always immersed in the mercury in tube 12 forming the other leg of the U-tube. Between the grid and cathode is impressed a biasing voltage by a battery 32 common to all the units through the grid bus, it being assumed that switch 7 of each unit is closed.

The output or plate circuit of tube 3 is connected to a control relay 33. As long as the contact rod 14 of the particular unit is withdrawn from the mercury in the U-tube so that a circuit is not completed, the potential impressed on the grid prevents flow of current through the plate circuit to energize relay 33. As soon as the rod establishes electrical contact with the mercury, however, battery 32 is shorted through it, removing the potential from the grid so that current may flow through the plate circuit of tube 3 to energize control relay 33. The current flowing through the grid circuit shunt by way of brush 30 and contact rod 14 is limited by a resistance 34 inserted in circuit with the battery. Relay 33, upon energization, actuates four armatures 35, 36, 37 and 38 connected in the power circuit of motor 5 of the same unit. Preferably armature 38 is moved mechanically by rod 70 reciprocated by armature 35, for a purpose described later.

For operating convenience a push-button switch 47 may be closed to energize a main switch relay 48 so that its armature makes contact to energize the starter bus. Plate current for actuation of relay 33 is supplied by a further secondary winding 49 of transformer 40, and a condenser 39 may be included in this circuit connected across the terminals of relay 33 to increase the precision with which it operates.

Each manometer unit circuit has a control switch 50 for its motor circuit which may be opened for any unit which it is desired to have remain inoperative. When a cycle of operation has been initiated through the circuit including this switch, however, a holding relay 51 will be energized to close its armature for completing a circuit directly from transformer winding 44 to the motor through the down bus connections, by-passing the armature of starting relay 48 in the master circuit and the unit control switch 50. The circuit of this holding relay is controlled by armature 38 of control relay 33, however, so that when the latter relay is energized the holding relay will be deenergized to interrupt the circuit effecting rotation of the motor 5 to drive rod 14 downward. At the same time the connections from both ends of transformer secondary winding 44 to signal light 52 will be broken by movement of armatures 35 and 37 as relay 33 is energized.

Armatures 35, 36 and 37 of control relay 33 complete a circuit between the motor and the transformer secondary winding 44 to drive the motor downward when the relay is deenergized, and armatures 36, 37 and 38 complete a circuit through the motor from secondary winding 45 when this relay is energized by contact of rod 14 with the mercury, to reverse the motor for driving such rod in the upward direction. In each case the motor circuit includes safety limit switches 53 and 54, respectively, between which some projecting portion of rod 14 moves, such as the flange 15' shown in Figure 2, which will engage one or the other of these switches to open it if the rod should move too far in one direction or the other. A fuse 55 may be placed in series with these switches, which would protect the circuit in the event that the motor should become jammed in a position locating flange 15' intermediate the limit switches 53 and 54.

Motors 5 must be reversible, which operation may be accomplished by changing a field winding connection from one terminal of the rotor to the other automatically. Also a variable resistance 56 may be placed in the down circuit for adjustment to regulate the speed of the motor while driving the rod 14 downward. A resistance 57 in parallel with the rotor of motor 5 may be altered to vary its speed while driving the rod upward. If it is desired to increase the speed of the motor for rapid withdrawal of rod 14 prior to a measuring operation of the system, normally closed switch 58 may be opened to disconnect this shunting resistance from the rotor. The motor field 59 is connected in series with the rotor in whichever direction it is rotating.

The operation of the mechanism through a single cycle is as follows. Main switch 4 will be closed, which immediately energizes transformer 43 to heat the filament of control tube 3. When it has been warmed sufficiently and the switches 50 of the various units to be operated are closed, switch 47 will be depressed to energize relay 48. It may be assumed that all the rods 14 are above the mercury in their respective manometer tubes. In each unit, therefore, current will flow through the armature of relay 48 from the lower end of secondary winding 44 to the starter bus, and through the switch 50 of each unit to one side of relay 51.

The instant holding relay 51 is energized, a circuit through its armature to one side of motor field 59 will be closed directly from the lower terminal of transformer secondary winding 44 through the down bus. The motor circuit will then be completed through the motor field, armature 36 of control relay 33, which is in the position shown in Figure 1 when this relay is deenergized, through the rotor of motor 5, armature 37 of control relay 33, speed adjusting resistance 56, fuse 55, limit switches 53 and 54, and armature 35 of relay 33 to the upper terminal of transformer winding 44 by way of its down bus connection. Since one side of light 52 is also connected to fuse 55, current will flow from the central lead 46 of winding 44 through the light and by the same path through the fuse to the upper end of such winding, to illuminate the light.

Control relay 33 will remain deenergized during this operation because of the potential impressed on the grid of vacuum tube 3 by battery 32. The motor will continue to rotate driving spindle 15 downward, simultaneously revolving it, until the rod tip engages the surface of the mercury in tube 11. As discussed previously, the eccentric tip, by virtue of its rotary motion and its shape, will instantly slice through the skin of the meniscus to establish an electrical contact. Immediately, therefore, the grid of vacuum tube 3 will be shorted through brush 30, rod 14, the mercury in tubes 11 and 12, and contact 31, so that the barrier to flow of plate current will no longer exist.

Relay 33, in series with the plate of tube 3 and the plate bus connected to secondary winding 49 of transformer 40, will consequently immediately be energized to reverse the position of armatures 35, 36, 37 and 38. This relay will remain energized as long as the grid of tube 3 is shorted because its circuit does not include any mechanical switching mechanism. The instant armature 35 is thus reversed, however, the motor circuit will be interrupted, and simultaneously movement of armature 38 will deenergize relay 51, so that the other side of the down motor circuit through the armature of the holding relay will be broken.

Although energization of relay 33 deenergizes motor 5, it will then be reenergized, but the other rotor terminal will be connected to the junction of field 59 and resistance 57, so that the motor will rotate reversely to raise rod 14. Current for such motor circuit flows from secondary winding 45 of transformer 40. From the upper terminal of this winding current will pass directly through the up bus to one side of the motor rotor and switch 58 through armature 36, where the current will be divided, one portion flowing through switch 58 and shunt variable resistance 57, and the other portion flowing through the rotor and control relay armature 37. The proportions of such current portions, and hence the speed at which the motor rotates, depends upon the value at which resistance 57 is set. The higher the resistance, of course, the greater will be the proportion of current flowing through the motor rotor, and consequently the faster will be the speed. The other side of motor field 59 is connected through control relay armature 38, fuse 55, limit switches 53 and 54 and a wire common to the grid and plate circuits of vacuum tube 3, through the up bus, to the lower terminal of transformer secondary winding 45, to complete the motor circuit.

With the motor now operating in reverse rod 14 will be raised. The speed of its movement in this direction, however, will be much slower than during downward movement of the rod because of the slower speed of the motor resulting both from the lower voltage impressed on it and resistance 57 shunting the rotor. Since the eccentric point of the rod is still moved circularly the grid circuit shunt will be interrupted abruptly upon withdrawal of the rod tip from the mercury for no blob of mercury will be drawn up from its surface. Consequently the position of the rod at the instant the grid circuit shunt is interrupted conforms almost exactly to the surface of the mercury column, and a record of the height of rod 14 when this circuit is broken can be made.

To obtain the comparative data desired it must be kept in mind that the positions of the several rods should be recorded at approximately the same time. Especially if the mercury column in one manometer unit is rising while that in another is falling, the tips of the rods will probably not disengage the surfaces of their respective columns at the same instant. Consequently I consider it preferable to stop the driving motor of each rod as soon as the grid shorting circuit is broken, and then to record the static positions of all the rods simultaneously.

When contact of a rod 14 with its mercury column is interrupted the voltage from battery 32 will again be impressed on the grid of vacuum tube 3 to reestablish the barrier to flow of plate current to relay 33. Consequently this relay will be deenergized, allowing spring biased armatures 35, 36, 37 and 38 to swing back to their positions shown in Figure 1. Such movement will, of course, immediately break the circuit between transformer secondary winding 45 and the motor 5 which was maintained through armatures 36, 37 and 38. The motor will not be reenergized to move in the initial direction, however, because, switch 47 being open, current cannot flow through the starter circuit to energize holding relay 51.

The fact that the cycle has been completed in each instance and the motor 5 of each unit has stopped is announced by illumination of its light 52. Although this light is energized, as mentioned previously, while the motor 5 is rotating in a direction to move rod 14 downward, no circuit is completed to either end of transformer secondary coil 44 from the lower light terminal during energization of the motor in the direction to drive rod 14 upward, while relay 33 is energized. Thus the connection from the upper end of coil 44 will be interrupted at armature 35 and the circuit from the lower end of winding 44 will be deenergized.

When the circuit through holding relay 33 is interrupted by withdrawal of rod 14 from the mercury, however, a circuit will be completed through the light 52 to the upper end of winding 44 by way of fuse 55, limit switches 53 and 54, and armature 35, despite the fact that holding relay 51 remains deenergized because switch 47 is open. When the lights 52 have all been illuminated again, therefore, the operator knows that the motors 5 of all the manometer units have stopped.

If before all lights 52 come on the mercury column in some manometer tube should rise sufficiently to touch the tip of its rod 14 and reestablish the grid shorting circuit, plate current again would flow through the corresponding vacuum tube 3 to energize control relay 33, and the armatures 35, 36, 37 and 38 would be reversed to reenergize motor 5 for rotation in the direction to raise rod 14 until it again clears the surface of the mercury. During such operation its light 52 will be extinguished to indicate such condition to the operator.

While, as pointed out above, it cannot be expected that all the rods 14 would leave their respective mercury columns at precisely the same instant, nevertheless they all will thus be moved within a very brief interval, and their motors will stop. Particularly will this be the case at the termination of a second cycle if, as soon as all the motors 5 have stopped, switch 47 should again be closed to initiate such further operation. The accuracy is increased by such manipulation because it will be known that at the beginning of the second cycle each rod 14 will be only slightly above the surface of the mercury in its tube 11, even though the mercury in some of the tubes should be falling gradually.

The operator may now record the positions of these rods, noting the readings on the several counters 6, shown in Figure 2. Alternatively the manometer units may be arranged so that all of these counters may be photographed simultaneously. A preferable construction, however, is to incorporate printing mechanism in each counter which may be operated by a stamper hammer 60 actuated by a solenoid 61, illustrated diagrammatically in Figure 1. Thus the motor circuits may all be deenergized positively, and all the stamper circuits closed simultaneously merely by reversal of switch 42.

If the manometer columns should be fluctuating rapidly in height an indication of the positions of the several rods 14 after they have all come to rest may afford an insufficiently accurate record of column height. An alternative method of operating the system, therefore, is to hold switch 47 closed, so that the instant control relay 33 is deenergized to release armatures 35, 36, 37 and 38 the motor 5 will be energized in a direction to drive its rod 14 downward. Thus each rod will continually hunt between a position in which the tip just clears the mercury surface and one in which it is submerged barely enough to complete the grid shunting circuit so that the motor will be reversed to drive the rod upward. At no time, therefore, will any rod be displaced much above or below the surface of its mercury column. Consequently at any instant switch 42 may be thrown to deenergize transformer 40 and stop all motors 5, and to operate all the stamper circuits.

Instead of opening switch 42 a spring coupling, or other equivalent lost motion mechanism, may be interposed between the rod driving spindle 15 and the counter of each unit, so that the counter will register the average value for its rod position in each instance. An indication of the height of rapidly fluctuating manometer columns cannot be obtained with as great accuracy as when the columns are relatively stable.

Before the system is operated according to either plan for measuring purposes, rods 14 should all be located approximately at the surface of the mercury in the respective manometer tubes. A cycle can then be completed quickly, for the downward movement of the rods will occur at a speed of about one inch in 3 or 4 seconds. While, as has been stated above, the upward travel of rods 14 is comparatively very slow, such operation, indicated by lights 52 being out, should require only about one second. The value of the resistances 56 and 57 in the several units should, of course, be adjusted before operation is initiated so that the downward speed of all the rods is substantially the same, and likewise the upward speed. After only a single cycle, where the mercury columns are steady, location of the rods can be indicated with an accuracy of eight ten-thousandths of an inch, while if the system is immediately recycled the error is less than three ten-thousandths of an inch.

The amount of mercury in the several manometer tubes need not be precisely the same, for a zero reading can be taken before differential pressures are applied to the manometer, when all the mercury columns will be in balance. The values to be measured during operation of the system, then, are the differences in height of the mercury columns over the zero readings.

Since, by the use of my novel contact rod tip, the travel of the rods 14 will be reversed to upward movement almost immediately after they touch the mercury columns, the motors will operate for only a brief interval to drive the rods upward. Because of the brevity of such operation and the comparatively slow speed at which such movement occurs the overtravel of the rods above the mercury columns will be very slight and almost exactly equal for all the manometer units. Such rod construction and operation accounts principally for the extreme and consistent accuracy of my mechanism, which prevails despite the presence of dirt or oxide on the surface of the mercury.

The light 52 of any unit remaining unilluminated for very long indicates to the operator either that the switch 58 for that unit is open, that one of the limit switches 53 or 54 is open, that the fuse 55 has blown, or that some other trouble is present in the corresponding unit.

The single cycle operation, previously described, contemplated that switch 7 of each unit would be closed. Under such circumstances, as stated, if some mercury column continued to rise after deenergization of relay 33, and thus the mercury again made contact with its rod 14, the corresponding relay 33 would be reenergized to retract the contact rod until it had once more been withdrawn from the mercury. If a mercury column should descend instead of rising, however, its contact rod would not follow the mercury down, unless the recycling operation described above was effected.

In some instances it may be preferred that the units be incapable of reenergization by a rising mercury column, as well as by a falling mercury column. Such operation may be accomplished merely by opening switch 7 of each unit to interrupt the direct connection from the plate bus to the cathode of tube 3. It is to control this circuit properly that armature 38 is under the mechanical control of armature 35, instead of being operated directly by energization of relay 33. When such armature is attracted by the relay it engages movable contact 71, to which rod 70 is attached. As this contact is pushed to the left the rod is reciprocated correspondingly and pulls armature 38 to swing it sufficiently to disengage its right contact and engage its left contact.

When switch 7 is open and relay 33 is deenergized no current can flow in the plate circuit to the relay, either through switch 7 or through relay contact 71 and armature 35. When switch 47 is closed to initiate operation of the mechanism, however, relay 51 is energized, as previously explained, to close its armature. Immediately upon contact of such armature the plate circuit is closed through it to the cathode of tube 3, and such circuit remains closed as long as holding relay 51 is energized.

Upon shorting of the grid circuit, to remove the negative grid bias in tube 3, by contact of rod 14 with the mercury of the manometer, as previously explained, relay 33 will be energized to attract its armature 35. Armature 38, being mechanically operated, will, however, not be moved immediately to deenergize holding relay 51, since such operation is effected by shifting of contact 71. This contact is moved, of course, only after a circuit is completed through it by engagement of armature 35. Upon such contact current may now flow from the left plate bus terminal through armature 35 to the cathode of tube 3, and such circuit will remain closed as long as relay 33 is energized. Consequently after this circuit is established deenergization of the plate circuit through the armature of relay 51 will not deenergize relay 33. The mechanical operation of armature 38 thus effects deenergization of relay 51 only after the alternative plate circuit through armature 35 has been completed.

When relay 33 is deenergized upon withdrawal of rod 14 from the mercury column, engagement of armature 35 with contact 71 will be interrupted. Despite the fact that armature 38 again engages its right contact, relay 51 will not be energized to close its armature circuit, because both switches 47 and 48 will be open. Since no circuit is now completed from the left plate bus terminal to the cathode of tube 3 either through switch 7, or through armature 35 and contact 71, or through the armature of relay 51, relay 33 cannot be energized even though the mercury column should rise sufficiently to short the grid circuit by engagement with contact rod 14. The entire unit will therefore remain deenergized until operation of the whole system is again initiated by closing of switch 47. When all the units are deenergized the stamper may be actuated to record the positions of all rods 14 by moving switch 42, as previously described.

I claim as my invention:

1. Electrical contact mechanism comprising a container, mercury in said container, a contact element having a tip engageable with the mercury in said container, and means operable to move the tip of said contact element generally parallel to the surface of the mercury at the instant of engagement therewith to slice through the mercury surface in making contact with the mercury.

2. Electrical contact mechanism comprising a container, mercury in said container, a contact rod having its lower end beveled to form a tip eccentric of its axis, and means operable simultaneously to effect relative approach movement of said rod and mercury lengthwise of the rod, and to rotate said rod substantially about its axis to effect arcuate movement of its tip as it contacts the surface of the mercury to slice through it in making contact with the mercury.

3. In a manometer, a tube containing a mercury column, a generally upright contact rod having a tip of blade form, and means operable to effect relative movement between said rod and mercury column lengthwise of the rod for effecting contact of said blade tip with the mercury, and further operable to move said rod for effecting edgewise movement of said blade generally parallel to the surface of the mercury at the instant of engagement therewith to slice through the mercury surface in making contact with the mercury.

4. In a manometer, a tube containing a column of mercury, a contact rod, and means operable to rotate said rod about an upright axis disposed eccentrically of the rod tip for moving such rod tip arcuately, and further operable to effect relative approach movement of said rod and mercury generally lengthwise of the rod for engaging the rod tip thus moved with the mercury.

5. In a manometer, a tube containing a column of mercury, a generally upright contact rod having a tip non-symmetrical about the axis of such rod, and means operable to effect simultaneous movement downward and rotatively about its axis of said rod relative to the mercury for effecting swiping contact of its tip therewith.

6. In a manometer, a tube containing a column of mercury, a generally upright contact rod, and drive means operable simultaneously to move said rod lengthwise relative to the mercury column, and to rotate said rod about an upright axis eccentrically of its tip, for effecting both arcuate movement of the rod tip generally parallel to the surface of the mercury and also translational movement of the rod tip in contact with the mercury.

7. In a manometer, a tube containing a column of mercury, a contact rod having its lower end beveled to form a tip eccentric of its axis, and means operable to effect movement of said rod relative to the mercury simultaneously lengthwise and rotatively about its axis, for effecting arcuate movement of the rod tip in contact with the surface of the mercury.

8. Electric contact mechanism, comprising a contact rod for establishing an electrical contact with a conducting liquid, having its end beveled to form a contacting blade tip at the periphery of the rod, and means operable to rotate said rod substantially about an axis extending lengthwise of said rod to move said blade tip in an orbit when making or breaking contact with such conducting liquid.

9. Electric contact mechanism, comprising a contact rod for establishing an electrical contact with a conducting liquid, having its end beveled concavely to form a contacting blade tip at the periphery of the rod, and means operable to rotate said rod substantially about an axis extending lengthwise of said rod to move said blade tip in an orbit when making or breaking contact with such conducting liquid.

10. A cylindrical contact rod for establishing an electrical contact with conducting liquid having a tip disposed at the rod's periphery and of much greater extent circumferentially of the rod than radially thereof to form a thin blade of substantial circumferential extent.

11. In a manometer system, master operating means, a plurality of individual manometer units energizable by said master operating means, each such unit including a manometer tube containing a mercury column, a contact rod for each tube, means operable to effect engagement of said rod with the mercury in said tube and disengagement of the rod therefrom, control means for said master operating means operable at will to initiate simultaneously downward movement of the contact rods in all said individual manometer units, and automatic control means for each individual manometer unit operable automatically to reverse the direction of movement of its control rod by engagement thereof with the mercury, entirely independently of the other of said manometer units.

12. In a manometer system, master operating means, a plurality of individual manometer units energizable by said master operating means, each such unit including a manometer tube containing a mercury column, a contact rod for each tube, means operable to effect engagement of said rod with the mercury in said tube and disengagement of the rod therefrom, control means for said master operating means operable at will to initiate simultaneously downward movement of the contact rods in all said individual manometer units, and automatic control means for each individual manometer unit operable automatically to reverse the direction of movement of its control rod by engagement thereof with the mercury, and to terminate movement of such rod by its disengagement from the mercury, entirely independently of the other of said manometer units.

13. In a manometer, a tube containing a column of mercury, a contact rod, drive means operable to move said rod and mercury relatively lengthwise of the rod, and control means operable to control said drive means for effecting approach movement of said rod and the mercury to engage the lower end of the rod with the mercury, and by such engagement being operable automatically to reverse said drive means for effecting separating movement of the rod and mercury for interrupting contact of the rod end with the mercury, and being further operable automatically to deenergize said drive means by disengagement of the rod end and the mercury to terminate separating movement thereof.

14. The manometer of claim 13, and recording mechanism operable to record the relative positions of the rod and mercury tube upon interruption of the contact between the rod end and the mercury.

15. In a manometer, a tube containing a mercury column, rotary drive means, a contact rod in said tube rotatable by said drive means and having a tip engageable with the mercury and disposed eccentrically of the axis about which it rotates, reversible means operable to move said rod lengthwise for moving the tip of said rod, while being rotated by said rotary drive means, into and out of contact with the mercury, and control means operable automatically for effecting reversal of said drive means for moving said rod to withdraw its tip from the mercury, energized by contact of the rod with the mercury, and further operable automatically to deenergize said drive means by withdrawal of the rod tip from the mercury to terminate movement of the rod.

16. In a manometer, a tube containing a column of mercury, a contact rod, drive means operable simultaneously to move said rod lengthwise and to rotate it about an axis disposed eccentrically of its lower end for effecting arcuate movement of such end, and control means operable automatically to control said drive means for moving said rod toward the mercury to engage its lower end therewith while rotating the rod in one sense, and by such engagement being operable automatically to reverse said drive means for withdrawing the rod end from the mercury while rotating the rod in the opposite sense, and being further operable automatically to deenergize said drive means by such withdrawal of the rod end from the mercury to terminate movement of the rod.

17. In a manometer, a tube containing a column of mercury, a contact rod having a beveled end, drive means operable simultaneously to move said rod lengthwise and to rotate it substantially about its axis for effecting arcuate movement of its lower end, and control means operable automatically to control said drive means for moving said rod toward the mercury to engage its beveled end therewith, and by such engagement being operable automatically to reverse said drive means and to effect operation thereof for withdrawing the rod end from the mercury at a slower speed than that at which the rod was moved toward the mercury, and being further operable automatically to deenergize said drive means by such withdrawal of the rod end from the mercury to terminate movement thereof.

18. In a manometer, a tube containing a column of mercury, a contact rod, drive means operable to move said rod lengthwise, and control means operable automatically to control said drive means for moving said rod toward the mercury to engage its end therewith, and by such engagement being operable automatically to reverse said drive means and to effect operation thereof for withdrawing the rod end from the mercury at a slower speed than that at which the rod was moved toward the mercury, and being further operable automatically to deenergize said drive means by such withdrawal of the rod end from the mercury to terminate movement thereof.

19. In a manometer, a tube containing a column of mercury, a contact rod, drive means operable to move said rod and mercury relatively lengthwise of the rod, and control means operable to control said drive means for effecting approach movement of said rod and the mercury to engage the lower end of the rod with the mercury, and by such engagement being operable automatically to reverse said drive means and to effect operation thereof for effecting separating movement of the rod and mercury at a slower speed than that of the approach movement for interrupting contact of the rod end with the mercury, and being further operable automatically to deenergize said drive means by disengagement of the rod end and the mercury to terminate separating movement thereof.

CHARLES MORGAN WOLFE.

REFERENCES CITED

The following references are of record in the file of this patent:

UNITED STATES PATENTS

| Number | Name | Date |
|---|---|---|
| 372,361 | Daft | Nov. 1, 1887 |
| 1,039,644 | Brunner | Sept. 24, 1912 |
| 1,664,265 | Rieber | Mar. 27, 1928 |
| 1,977,498 | Staegemann | Oct. 16, 1934 |
| 2,235,123 | Stubbins | Mar. 18, 1941 |